Patented Mar. 11, 1930

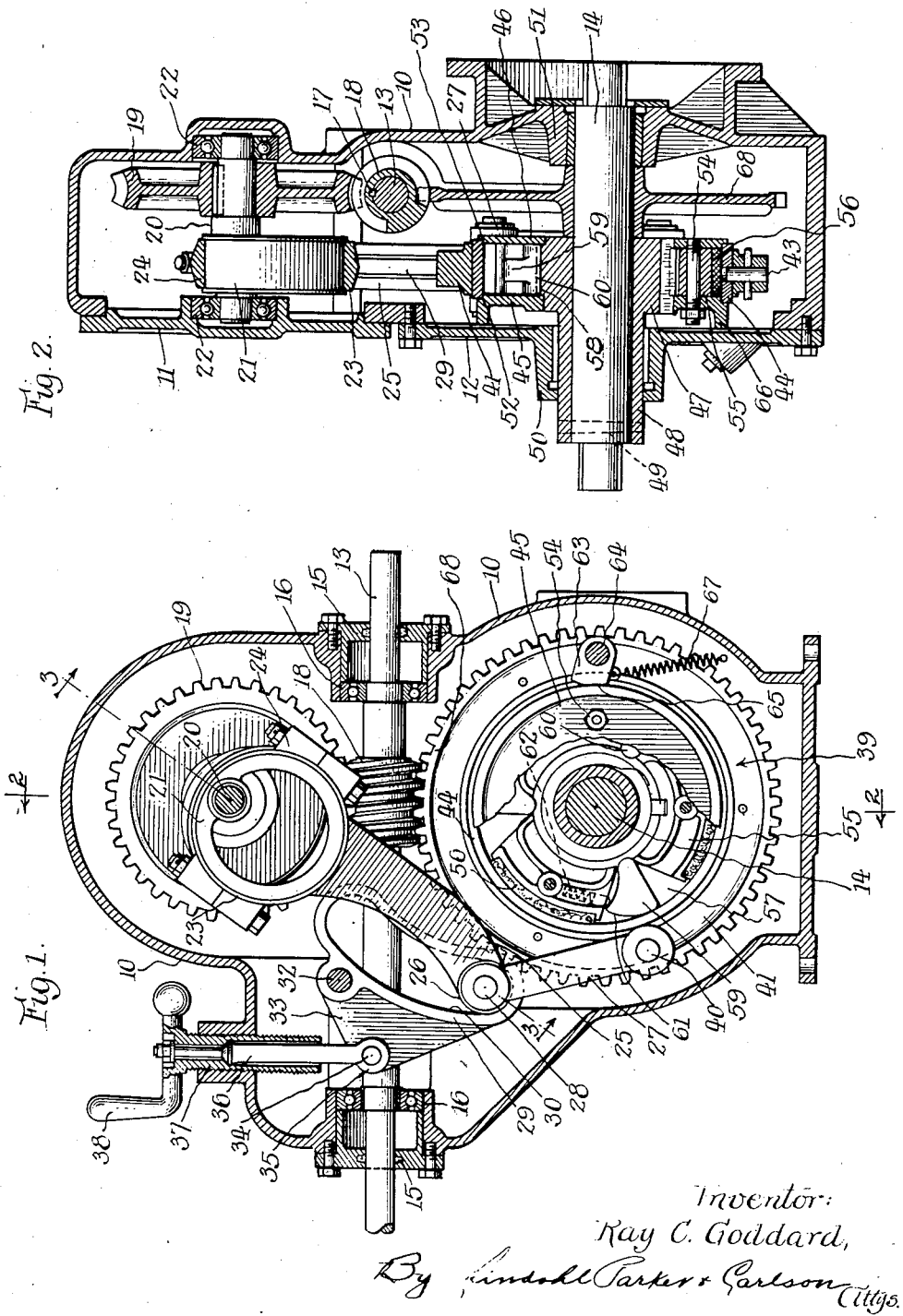

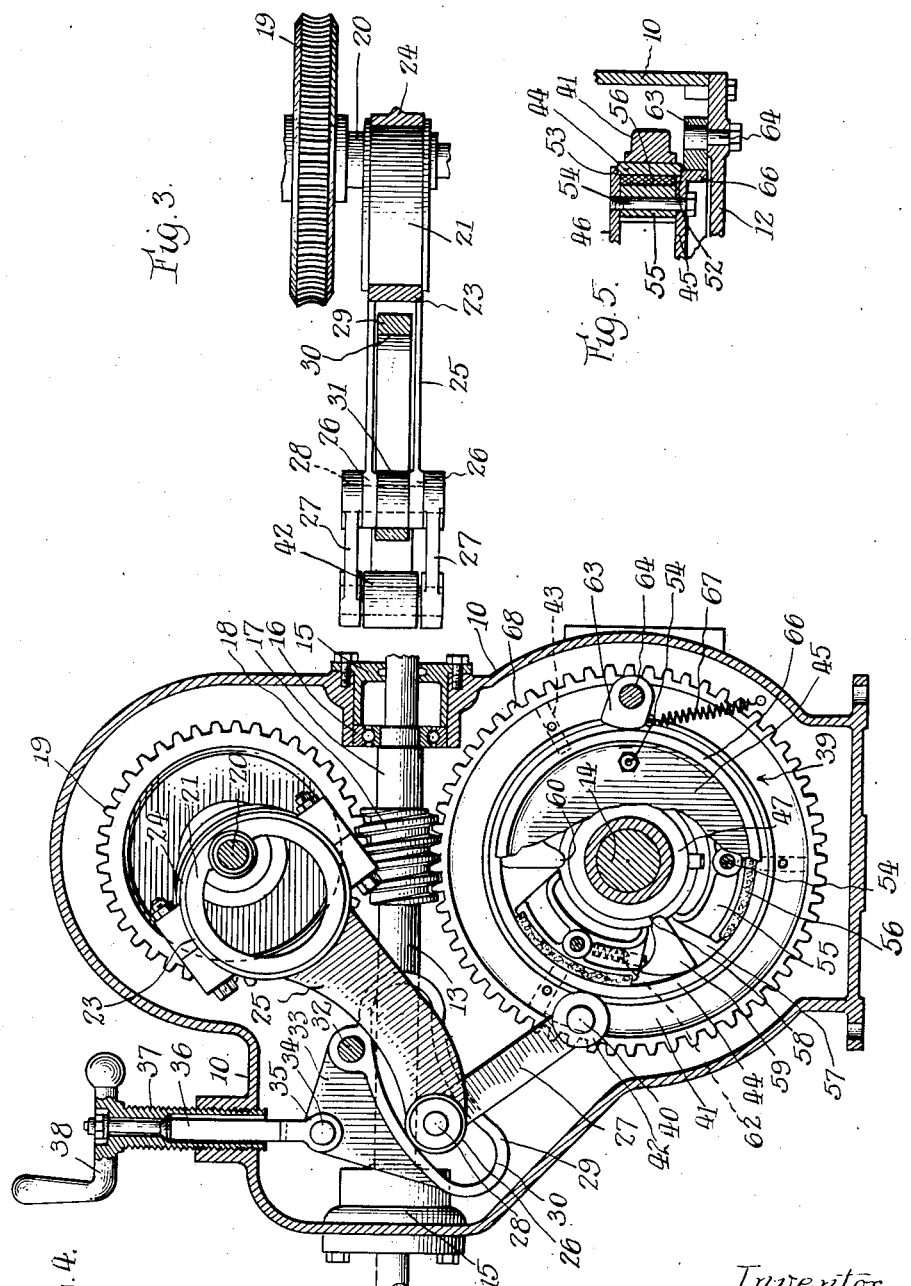

1,749,879

UNITED STATES PATENT OFFICE

RAY C. GODDARD, OF WHEATON, ILLINOIS, ASSIGNOR, BY DIRECT AND MESNE ASSIGNMENTS, TO COMBUSTIONEER, INC., OF CHICAGO, ILLINOIS, A CORPORATION OF ILLINOIS

TRANSMISSION MECHANISM

Application filed February 13, 1928. Serial No. 253,832.

The present invention relates to improvements in power transmission mechanisms of the variable speed type adapted to be interposed between a source of power and a driven member, such as the moving element of a coal stoker.

The objects of the invention reside in the provision of a novel transmission mechanism having one or more of the following features:

1. A wide range of adjustment whereby the speed of the driven member may be adjusted to any point between a maximum and a dead stop without stopping or adjusting the speed of the driving member.

2. An alinement of forces in the transmission elements of the mechanism.

3. Quietness of operation, an important feature in apartment houses and buildings where silence is desirable.

4. Ease of control and adjustment.

5. A construction that is simple, relatively inexpensive, compact, adaptable to a wide range of uses, accessible for purposes of repair and replacement, and susceptible of being readily assembled and disassembled.

Further objects and advantages will become apparent as the description proceeds.

In the accompanying drawings, Figure 1 is a vertical sectional view through the casing, with parts of the inner mechanism broken away and other parts thereof shown in section, of a device embodying the features of my invention.

Fig. 2 is a vertical sectional view taken along line 2—2 of Fig. 1.

Fig. 3 is a fragmentary sectional view taken along line 3—3 of Fig. 1.

Fig. 4 is a fragmentary view generally similar to Fig. 1, but showing the adjustable parts in such position of adjustment that no movement is imparted to the driven member.

Fig. 5 is a detailed fragmentary view of the braking means for the clutch mechanism.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention illustrated in the drawings, the mechanism comprises a suitable casing 10. Preferably, this casing is an integral closed casting having removable upper and lower cover plates 11 and 12 at the front. Extending into the casing 10 are a driving member 13 and a driven member 14. These two members are operatively connected in the casing 10 by a transmission which is adjustable to obtain any desired speed ratio between the members from maximum to zero movement for the driven member. The movement of the driven member may be continuous or intermittent. While the mechanism is adapted for a wide variety of adaptations, it is particularly adapted for use with coal stokers, and to this end, the driving member 13 may be operatively connected to a source of power (not shown), and the driven member 14 may be operatively connected to the desired movable part of the stoker, for example, the stoker feed screw (not shown).

In the present instance, the member 13 consists of a shaft which extends laterally and substantially centrally through the casing 10, and which is suitably journalled in bushings 15 and ball bearings 16 in opposite sides thereof. Rigidly secured to the shaft 13, as by a key 17, is a worm 18 which meshes with a worm wheel 19 keyed to a stub shaft 20 overhead. The latter is an eccentric shaft, being formed integral with an eccentric 21 on its front end, and is suitably supported at its front and rear ends in ball bearings 22 mounted respectively in the upper cover plate 11 and the rear wall of the casing 10. Embracing the periphery of the eccentric 21 is an eccentric strap 23 comprising a suitable removable end cap 24. The strap 23 is suitably formed integral with an eccentric arm 25 extending laterally therefrom. The eccentric 21 constitutes a throw adapted upon rotation to impart a reciprocatory motion to the arm 25. Preferably, the eccentric arm 25 is bifurcated throughout most of its length, and the free ends of the bifurcations are formed with suitable spaced axially alined bearings 26. Removal of the cover plate 11 permits access to and removal of the shaft 20 and the parts associated therewith.

The eccentric arm 25 is operatively connected to one end of a connecting means, preferably comprising two parallel bars or rods 27. To this end, the upper ends of the bars 27 are pivotally secured over the outer sides of the free end of the arm 25 by means of a pivot pin 28 extending through the bearings 26. The lower ends of the bars 27 are operatively connected to means, a suitable form of which will be hereinafter described, for transmitting longitudinal reciprocatory movement of the bars 27 in the form of rotary motion to the driven shaft 14.

Means is provided for guiding the movement of the pivot between the arm 25 and the bars 27 so as to direct a component of the thrust of said arm along said bars. This means preferably comprises a fixed link 29 having an arcuate slot 30, and disposed between the bifurcations of the arm 25. Mounted on the pin 28 between the bearings 26 is a suitable bearing roller 31 which is slidably disposed in the slot 30. By means of this double construction, a central thrust is always obtained, thereby resulting in ease and quietness of operation.

Means is provided for varying the component of thrust of the arm 25 longitudinally of the bars 27. To this end, the link 29 is pivotally mounted on a pivot pin 32, and is formed with a heel 33. A pin 34 in the heel 33 engages the eye 35 of an eye bolt 36. The latter extends through and is rotatably supported by an elongated sleeve 37 threaded into the casing 10. The sleeve 37 is provided with a suitable adjusting handle 38 whereby it may be raised or lowered to indirectly adjust the angular disposition of the slot 30. The slot 30 has a radius corresponding in length to the bars 27 so that when the bars are normal thereto, the thrust of the eccentric arm 25 will pivot the bars but will not impart longitudinal motion thereto. It will thus be evident that by adjusting the link 29, the longitudinal movement of the bars 27 for a given movement of the arm 25 can be adjusted to any desired point intermediate of and including the maximum and zero.

While any suitable means may be interposed between the driven shaft 14 and the bars 27 for converting reciprocatory movement of the former into rotary motion of the latter, preferably an over-running friction clutch, designated generally as 39, is provided. To this end, the lower ends of the connecting bars 27 are pivotally connected by means of a pin 40 to a rotatable clutch ring 41. Preferably, the pin 40 is disposed in a tubular enlargement 42 formed at the periphery of the ring 41. Secured to the inside of the ring 41, and preferably keyed thereto by means of a key 43 is a clutch liner 44 of hardened material. This clutch liner is rotatably mounted on the periphery of and between two parallel spaced annular front and rear disks 45 and 46 which are in turn secured to the periphery of an enlargement 47 of a clutch quill 48 suitably secured as by a key 49 to the driven shaft 14. Preferably, the quill 48 is journaled in a suitable bearing 50 in the lower cover plate 12, and the rear end of the shaft 14 is journaled in a bearing 51 in the rear wall of the casing 10. Preferably, the disks 45 and 46 are seated in peripheral notches 52 and 53 in the end edges of the enlargement 47, and are clamped together in assembled relation by means of a plurality of spaced stud bolts 54.

Pivotally mounted on each of the bolts 54 between the disks 45 and 46 is an arcuate spacer member 55 having a felt pad 56 at its peripheral surface engaging the inner periphery of the liner 44. The spacer members 55 define a plurality of outer diverging spaces or pockets 57. Formed in the periphery of the enlargement 47 and extending longitudinally thereof are a plurality of spaced, preferably semi-cylindrical bearing notches 58 which are arranged at the inner ends of the spaces 57. A plurality of clutch pawls 59 are mounted respectively and loosely in the spaces 57. Each clutch pawl 59 is generally triangular in shape, and has an inner rounded end 60 adapted to bear and pivot in the associated notch 58. The outer end of each pawl 59 is arcuate as indicated at 61, but the arc is struck from a center at one side of the pivotal center, and hence is eccentric thereto. It will be evident that movement of the liner 44 in a counterclockwise direction tends through friction to pivot the pawls 59 into clutching engagement therewith, and that movement of the liner in the opposite direction tends to pivot the pawls out of clutching engagement. Hence only the downward strokes of the bars 27 are effective to rotate the shaft 14, and these effect intermittent rotation in but one direction. To overcome the influence of gravity on the pawls in certain positions of the clutch, springs 62 are provided tending to pivot the pawls individually into engagement with the liner 44. The springs 62 are seated in the ends of the spacer members 55.

To prevent rotation of the shaft 14 in a counterfeed direction, a brake pawl 63 is provided. This pawl is pivotally mounted on a bolt 64 on the inside of the cover 12, and has an eccentric arcuate end surface 65 adapted to be moved into and out of frictional engagement with the outer periphery of an annular flange 66 on the front end of the disk 45. A spring 67 tends to hold the pawl 63 in engagement with the flange 66. It will be evident that movement of the flange 66 in a clockwise direction will tend to pivot the brake pawl into braking engagement with the flange, and that movement of the flange in the opposite direction will tend to pivot the pawl out of engagement therewith.

The lower end of the casing 10 constitutes an oil chamber. Mounted on the shaft 14 is a suitable oil gear 68 meshing with the underside of the worm 18. The oil gear 68 may be formed to carry oil upwardly and spill same, and in general serves to effect lubrication of the parts above the oil bath.

In operation, the shaft 13 is driven at the desired speed, and drives the eccentric 21 to reciprocate the eccentric arm 25. The link 29 guides the pivot between the arm 25 and the connecting bars 27 to transmit a predetermined component of the thrust of the arm along the bars. The extent of movement of the bars is adjustable by adjusting the angular disposition of the slot 30. If the slot 30 is normal to the bars 27 the latter will pivot on the pin 40, but no longitudinal motion will be imparted thereto. The arm 25 and the bars 27 thus constitute an adjustable toggle with the controlling link acting on the toggle joint at one side of the eccentric. On each downward stroke of the connecting bars 27, the pawls 59 will engage the liner 44 to rotate the shaft 14 in a counterclockwise direction, as viewed in Fig. 1. On each upward stroke of the bars 27, the clutch ring 41 and the clutch liner 44 will rotate freely in a clockwise direction without rotating the shaft 14. The brake pawl 63 prevents the clutch from moving in a clockwise direction as it otherwise might when operating against a heavy load.

It will be evident that I have provided a new and highly advantageous transmission mechanism which has a wide range of adjustments, which is adjustable to bring the driven member to a dead stop, which is quiet in operation, and in which the forces from one element to another are transmitted centrally and hence without side thrust.

I claim as my invention:

1. A unitary transmission mechanism having, in combination, an enclosing casing, a driving element, a driven element, said elements extending into said casing, an eccentric having an arm operatively connected to said driving element, a reciprocatory member operatively connected to said driven element for rotating the latter upon being reciprocated, said member being pivotally connected to said arm, and a fixed link having an arcuate slot for guiding the movement of the pivot between said arm and said member, said link being adjustable to dispose the slot at different angles to said member so as to vary the component of the thrust from said arm along said member.

2. A unitary transmission mechanism having, in combination, an enclosing casing, a driving element, a driven element, a throw operatively connected to said driving element, a member reciprocable by said throw and pivotal thereon, a second member pivotally connected to said first mentioned member, means pivotally connected to said second member and operable to transmit reciprocatory movement thereof in the form of rotary movement to said driven member, a fixed link having an arcuate slot adapted to be positioned normal to said second member with the pivotal connection of said second member and said means as its center, and means for angularly adjusting said link.

3. A transmission mechanism having, in combination, an enclosing casing, a driving shaft rotatably mounted in said casing, a driven shaft rotatably mounted in said casing, means having a throw operatively connected to said driving shaft, a bar pivotally connected at one end to said means, a clutch operatively associated with said driven shaft and having an oscillatory member pivotally connected to the other end of said bar, and fixed means for guiding the pivotal connection between said first mentioned means and said bar, said guiding means being adjustable to vary the reciprocatory movement of said bar.

4. A transmission mechanism having, in combination, a casing, a shaft in said casing, a worm on said shaft an intermediate shaft in said casing, an eccentric and a worm gear on said intermediate shaft, said worm gear being in mesh with said worm, an eccentric arm connected to said eccentric, a driven shaft in said casing, a one-way rotary clutch operatively connected to said driven shaft and having an oscillatory member, a bar pivotally connected to said arm and said member, means for guiding the movement of the pivotal connection between said arm and said bar, said last mentioned means being adjustable to adjust the component of thrust from said arm along said bar, brake means for preventing movement of said driven shaft in reverse direction, and an oil gear on said driven shaft and meshing with said worm.

5. A transmission mechanism having, in combination, an enclosing casing, a driving shaft rotatably mounted in said casing, a driven shaft rotatably mounted in said casing, means having a throw operatively connected to said driving shaft, a bar pivotally connected at one end to said means, a clutch operatively associated with said driven shaft and having an oscillatory member pivotally connected to the other end of said bar, and fixed means having a slot for guiding the pivotal connection between said first mentioned means and said bar, said last mentioned means being adjustable to dispose said slot at different angles to vary the reciprocation of said bar from zero to maximum.

6. A transmission mechanism having, in combination, a casing, a shaft in said casing, a worm on said shaft, an intermediate shaft in said casing, an eccentric and a worm gear on said intermediate shaft, said worm gear meshing with said worm, an eccentric arm associated with said eccentric, a driven shaft in said casing, a clutch operatively connected to said driven shaft and having an oscillatory member, a bar pivotally connected to said arm and said member, means for guiding the movement of the pivotal connection between said arm and said bar, said last mentioned means being adjustable to adjust the component of thrust from said arm along said bar, and brake means operatively related to said clutch to prevent rotation of said driven shaft in one direction.

7. In a transmission mechanism, in combination, an elongated member pivotally secured at one end and having a longitudinal throw, a second elongated member having a moving pivot at one end and pivotally secured at its other end to the other end of said first member, a fixed guide having an arcuate slot for guiding the connection between said members, said guide being disposed to one side of the remote ends of said members and being adjustable to vary the angular disposition of said slot, said slot being formed on a radius equal to the length of said second elongated member.

8. A transmission mechanism comprising, in combination, an enclosing casing, a driving shaft in said casing, a worm on said shaft, a driven shaft below said driving shaft and extending transversely thereof, a shaft above said driving shaft and extending transversely thereof, a gear on said last mentioned shaft in mesh with said worm, an eccentric on said last mentioned shaft, an eccentric strap embracing said eccentric and having a lateral arm, a clutch for said driven shaft, said clutch including an oscillatory member, a link pivotally connecting the free end of said arm to said oscillatory member, a guide member pivotally adjustable in said casing and having an arcuate slot embracing the pivot between said arm and said link, and means for adjusting said guide member and retaining the latter fixedly in any selective position of adjustment.

9. A transmission mechanism comprising, in combination, a casing, a driving element in said casing, a driven element in said casing, a rotary throw member operatively connected to said driving element, a reciprocatory member operable by said throw, said reciprocatory member having a pair of parallel spaced arms, a pivot pin extending through the free ends of said arms, a guide member disposed between said arms and having a slot embracing said pivot pin, means for angularly adjusting said guide member to adjust the direction of movement of said pivot pin, a clutch for said driven element, said clutch having an oscillatory member, and a pair of parallel links pivotally secured at one end to opposite ends of said pivot pin, and pivotally secured at the other end to said oscillatory member.

10. A transmission mechanism comprising, in combination, an enclosing casing, a horizontal driving shaft in said casing, a worm on said shaft, a horizontal driven shaft extending transversely of said driving shaft and therebelow, a gear loosely mounted on said driven shaft and in mesh with said worm, a clutch for said driven shaft, a third shaft extending transversely above said driving shaft, a gear rigid with said third shaft and in mesh with said worm, a throw secured on said third shaft, and means operatively connecting said throw to said clutch, the bottom of said casing being adapted to contain a bath of lubricant partly immersing said first mentioned gear.

In testimony whereof, I have hereunto affixed my signature.

RAY C. GODDARD.